US009369636B2

(12) United States Patent
Zhao

(10) Patent No.: US 9,369,636 B2
(45) Date of Patent: Jun. 14, 2016

(54) VIDEO SIGNAL PROCESSING METHOD AND CAMERA DEVICE

(71) Applicant: Huawei Technologies Co., Ltd., Shenzhen (CN)

(72) Inventor: Guangyao Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/524,412

(22) Filed: Oct. 27, 2014

(65) Prior Publication Data

US 2015/0042845 A1 Feb. 12, 2015

Related U.S. Application Data

(63) Continuation of application No. PCT/CN2013/071490, filed on Feb. 7, 2013.

(30) Foreign Application Priority Data

Apr. 28, 2012 (CN) .......................... 2012 1 0132616

(51) Int. Cl.
*H04N 5/228* (2006.01)
*H04N 5/265* (2006.01)
(Continued)

(52) U.S. Cl.
CPC ............... *H04N 5/265* (2013.01); *H04N 5/225* (2013.01); *H04N 5/23232* (2013.01);
(Continued)

(58) Field of Classification Search
CPC .......... H04N 5/23232; H04N 5/23229; H04N 5/23235; G06T 3/4038; G06T 2200/32

USPC ...................... 348/218.1, 222.1, 223.1, 229.1
See application file for complete search history.

(56) References Cited

U.S. PATENT DOCUMENTS 2,931,267 A   4/1960  Hoch
4,760,385 A   7/1988  Jansson et al.
(Continued)

FOREIGN PATENT DOCUMENTS

CN        1126411 A    7/1996
CN    101039417 A    9/2007
(Continued)

OTHER PUBLICATIONS

Partial English Translation and Abstract of Chinese Patent Application No. CN101500063A, Jan. 9, 2015, 3 pages.
(Continued)

*Primary Examiner* — Kelly L Jerabek
(74) *Attorney, Agent, or Firm* — Conley Rose, P.C.; Grant Rodolph

(57) ABSTRACT

A video signal processing method and a camera device. The method includes obtaining a video signal, and splitting several frames of images in the video signal into two or more sub-images; performing first processing on the two or more sub-images of the several frames of images using two or more image sensor processor (ISP) processing units; and outputting the processed two or more sub-images of the several frames of images. The present invention can improve resolution of output images, make images at joints clear, and implement an ultra-high resolution camera, thereby avoiding deficiencies such as image overlapping or missing at a seam, color difference, and out of synchronization that occur because an existing ultra-high definition video camera system uses a plurality of cameras to perform image splicing.

13 Claims, 8 Drawing Sheets

(51) Int. Cl.
*H04N 5/225* (2006.01)
*H04N 5/232* (2006.01)
*H04N 9/04* (2006.01)
*H04N 5/243* (2006.01)
*H04N 7/15* (2006.01)
*H04N 9/64* (2006.01)
*H04N 9/67* (2006.01)
*H04N 9/69* (2006.01)
*H04N 9/73* (2006.01)

(52) U.S. Cl.
CPC ............... *H04N 5/243* (2013.01); *H04N 7/15* (2013.01); *H04N 9/045* (2013.01); *H04N 9/643* (2013.01); *H04N 9/67* (2013.01); *H04N 9/69* (2013.01); *H04N 5/23296* (2013.01)

(56) References Cited

U.S. PATENT DOCUMENTS

| | | | |
|---|---|---|---|
| 5,187,571 A | 2/1993 | Braun et al. | |
| 8,045,018 B2* | 10/2011 | Uchida | H04N 1/0035 348/14.13 |
| 8,537,234 B2* | 9/2013 | Litvinov | G06T 3/4015 348/222.1 |
| 8,547,444 B2* | 10/2013 | Kinrot | G06T 5/003 348/208.99 |
| 8,830,340 B2* | 9/2014 | Burt | H04N 5/23212 348/222.1 |
| 2005/0128323 A1 | 6/2005 | Choi | |

FOREIGN PATENT DOCUMENTS

| | | |
|---|---|---|
| CN | 101257622 A | 9/2008 |
| CN | 101500063 A | 8/2009 |
| CN | 102665031 A | 9/2012 |
| EP | 0720372 A1 | 7/1996 |

OTHER PUBLICATIONS

Partial English Translation and Abstract of Chinese Patent Application No. CN101039417A, Nov. 26, 2014, 4 pages.

Partial English Translation and Abstract of Chinese Patent Application No. CN102665031A, Nov. 13, 2014, 2 pages.

Foreign Communication From a Counterpart Application, Chinese Application No. 201210132616.5, Chinese Office Action dated Jun. 16, 2014, 9 pages.

Foreign Communication From a Counterpart Application, PCT Application No. PCT/CN2013/071490, English Translation of International Search Report dated May 16, 2013, 3 pages.

Foreign Communication From a Counterpart Application, PCT Application No. PCT/CN2013/071490, English Translation of Written Opinion dated May 16, 2013, 10 pages.

* cited by examiner

VIDEO SIGNAL PROCESSING METHOD AND CAMERA DEVICE

CROSS-REFERENCE TO RELATED APPLICATION

This application is a continuation of International Application No. PCT/CN2013/071490, filed on Feb. 7, 2013, which claims priority to Chinese Patent Application No. 201210132616.5, filed on Apr. 28, 2012, both of which are hereby incorporated by reference in their entireties.

TECHNICAL FIELD

The present invention relates to the camera field, and in particular, to a video signal processing method and a camera device.

BACKGROUND

With the development of video technologies, people are in pursuit of higher video resolution and larger screens; a telepresence conference system is a most typical application. In the prior art, a plurality of 1920×1080 monitors is spliced to form a larger monitor, or a plurality of projectors is used to implement a large high-resolution seamless screen using an integration technology. Likewise, this application also requires ultra-high resolution cameras; in the prior art, a plurality of cameras is used to perform image splicing, to provide an ultra-high resolution video source.

After analyzing the prior art, the inventor finds that the prior art has at least the following disadvantage.

In the prior art, generally a plurality of high-definition cameras is placed at specific angles, and a large ultra-high resolution image is formed by splicing images obtained by the high-definition cameras. When the images obtained by the plurality of high-definition cameras are directly used to perform the splicing, because optical centers of the cameras do not coincide with each other, only scenes at a specific distance can be spliced seamlessly, some images may be missing at a joint for a scene that is nearer than the distance, and some images may be repeated at a joint for a scene that is farther than the distance, so the images at the joints are unclear and have low resolution.

SUMMARY

In order to improve resolution and ensure image quality at image joints, embodiments of the present invention provide a video signal processing method and a camera device. The technical solutions are as follows.

According to one aspect, the present invention provides a video signal processing method, including obtaining a video signal, and splitting several frames of images in the video signal into two or more sub-images; performing first processing on the two or more sub-images of the several frames of images using two or more image sensor processor (ISP) processing units, where a quantity of the two or more sub-images is the same as a quantity of the two or more ISP processing units; and outputting the processed two or more sub-images of the several frames of images.

According to another aspect, the present invention provides a camera device, including a lens, a sensor, an image splitter, a controller, and two or more ISP processing units, where the sensor is configured to obtain a video signal using the lens. The image splitter is configured to split several frames of images in the video signal into two or more sub-images, and transmit the two or more sub-images of the several frames of images to the two or more ISPs respectively, where a quantity of the two or more sub-images is the same as a quantity of the two or more ISP processing units. The two or more ISP processing units are configured to perform first processing on the two or more sub-images of the several frames of images using the two or more ISP processing units, and output the processed two or more sub-images of the several frames of images, where the quantity of the two or more sub-images is the same as the quantity of the two or more ISP processing units; and the controller is configured to control the two or more ISP processing units.

The present invention provides a video signal processing method and a camera device, where a video signal is obtained, and several frames of images in the video signal are split into two or more sub-images. First processing is performed on the two or more sub-images of the several frames of images using two or more ISP processing units, where a quantity of the two or more sub-images is the same as a quantity of the two or more ISP processing units; and the processed two or more sub-images of the several frames of images are output. Using technical solutions of the present invention, an image is split and each of two or more ISP processing units is used to perform processing on a sub-image after splitting, which may improve resolution of output images, make images at joints clear, and implement an ultra-high resolution camera, thereby avoiding deficiencies such as image overlapping or missing at a seam, color difference, and out of synchronization that occur because an existing ultra-high definition video camera system uses a plurality of cameras to perform image splicing.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1A:
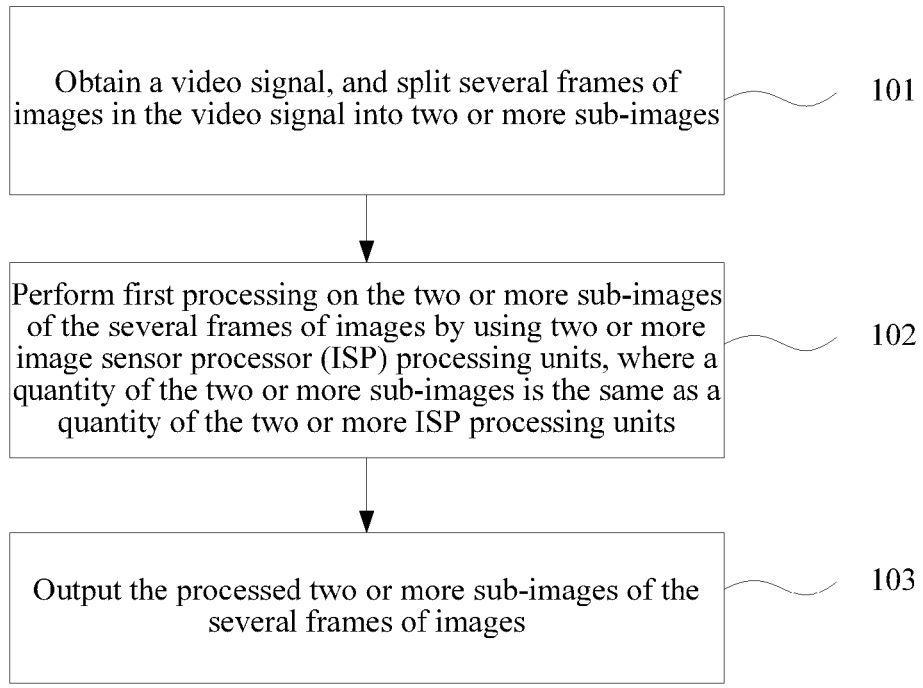
FIG. 1A is a flowchart of a video signal processing method according to an embodiment of the present invention.

FIG. 1A is a flowchart of a video signal processing method according to an embodiment of the present invention. Referring to FIG. 1A, this method includes the following steps:

101. Obtain a video signal, and split several frames of images in the video signal into two or more sub-images.

A process of obtaining the video signal in step 101 may be implemented by an image sensor. Preferably, the image sensor is an ultra-high definition image sensor that is applicable to a digital single-lens reflex camera; for example, the image sensor may be an area image sensor (AIS), where a plurality of image capturing components are arranged in a matrix form inside the AIS; a specific principle and a mode of operation of the AIS are consistent with those disclosed in the prior art, and are not described herein again.

Splitting each frame of image of the several frames of images may be performed using any one of the following methods. (1) split an image frame into a plurality of sub-images of preset orientations according to the preset orientations (heights and widths of the sub-images); (2) split an image frame into two or more sub-images according to a preset pixel value, where a maximum of pixel values included in each sub-image is the preset pixel value; and (3) split an image frame into N sub-images of equal orientations according to a quantity N of ISP processing units. A manner of the splitting includes but is not limited to the foregoing methods, and is not limited in this embodiment of the present invention.

Further, each sub-image after the splitting has a corresponding location parameter, where the location parameter includes coordinates of a start point of the sub-image in an original image and an orientation of the sub-image (a height and a width of the sub-image).

Figure 1B:
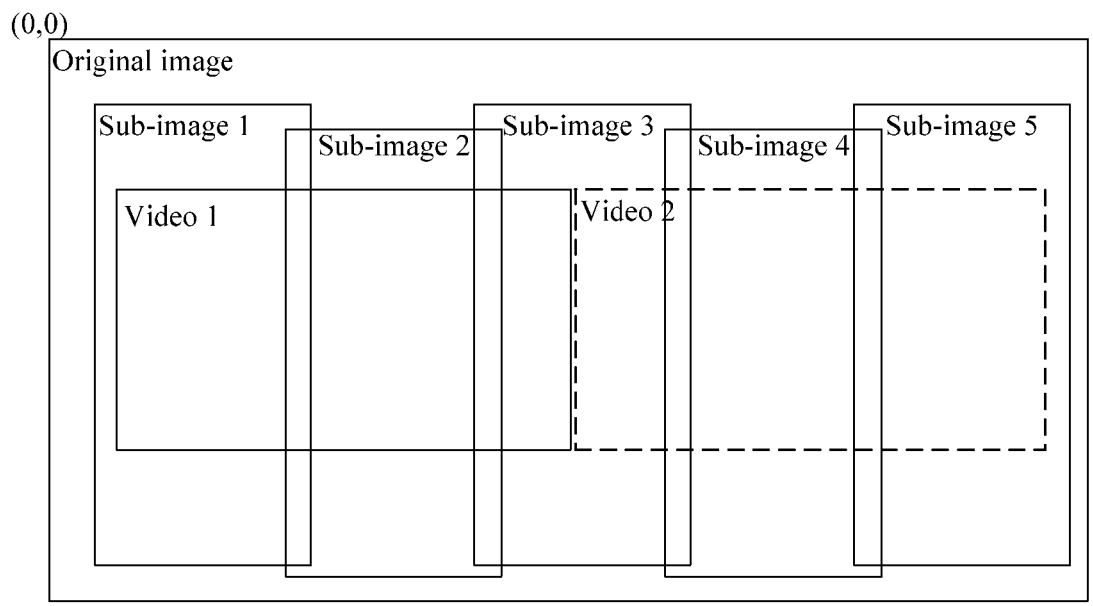
FIG. 1B is a schematic diagram of image splitting.

It should be noted that when image splitting is performed, adjacent images may have an overlapping portion and may also have a seam portion; certainly, seamless splicing may also be performed; a specific manner of splitting an image may be adjusted according to an arrangement of playback devices and specific forms of the playback devices. Referring to FIG. 1B, dotted lines show an original image, where relative coordinates of an origin of the original image are (0, 0); a sub-image 1, a sub-image 2, a sub-image 3, a sub-image 4, and a sub-image 5 are shown by solid lines in FIG. 1B, where generally a segment of an overlapping area exists; when splitting is performed, coordinates (StartX, StartY) of a start point of each sub-image and an orientation (Width, Height) of each sub-image may be set.

A person skilled in the art may learn that the image splitting may be implemented using an image splitter; the image splitter is configured to split one large screen (one frame of image) into a plurality of sub-screens (sub-images), where overlapping areas between sub-screens are allowed.

In this embodiment, after the video signal is obtained, each frame of the several frames of images of the video signal is split into two or more sub-images, where the several frames may be all image frames included in the video signal, or a part of image frames included in the video signal.

Preferably, after the video signal is obtained, each frame of image in the video signal may be split into two or more sub-images, to achieve an optimal processing effect.

102. Perform first processing on the two or more sub-images of the several frames of images using two or more ISP processing units, where a quantity of the two or more sub-images is the same as a quantity of the two or more ISP processing units.

The first processing includes one or more of the following video processing functions: zoom processing, CFA interpolation processing, red, green, blue to red, green, blue (RGB2RGB) transform, gamma transform, and red, green, blue, luminance, blue difference component, red difference component (RGB2YCbCr) transform. The following describes the foregoing video processing functions one by one.

(1) The zoom processing indicates that an ISP processing unit performs zoom-in or zoom-out processing on three primary colors, red, green, blue (RGB), of a received sub-image, where the zoom processing may be performed according to a preset zoom parameter; a specific formula of the zoom processing may be as follows: Rout=GainR×Rin; Gout=GainG×Gin; Bout=GainB×Bin; where Rin, Gin, and Bin are indexes of the three primary colors of the received sub-image respectively; GainR, GainG, and GainB are preset zoom parameters corresponding to the three primary colors respectively; and Rout, Gout, and Bout are indexes of the three primary colors after the zoom processing.

Figures 1C, 2:
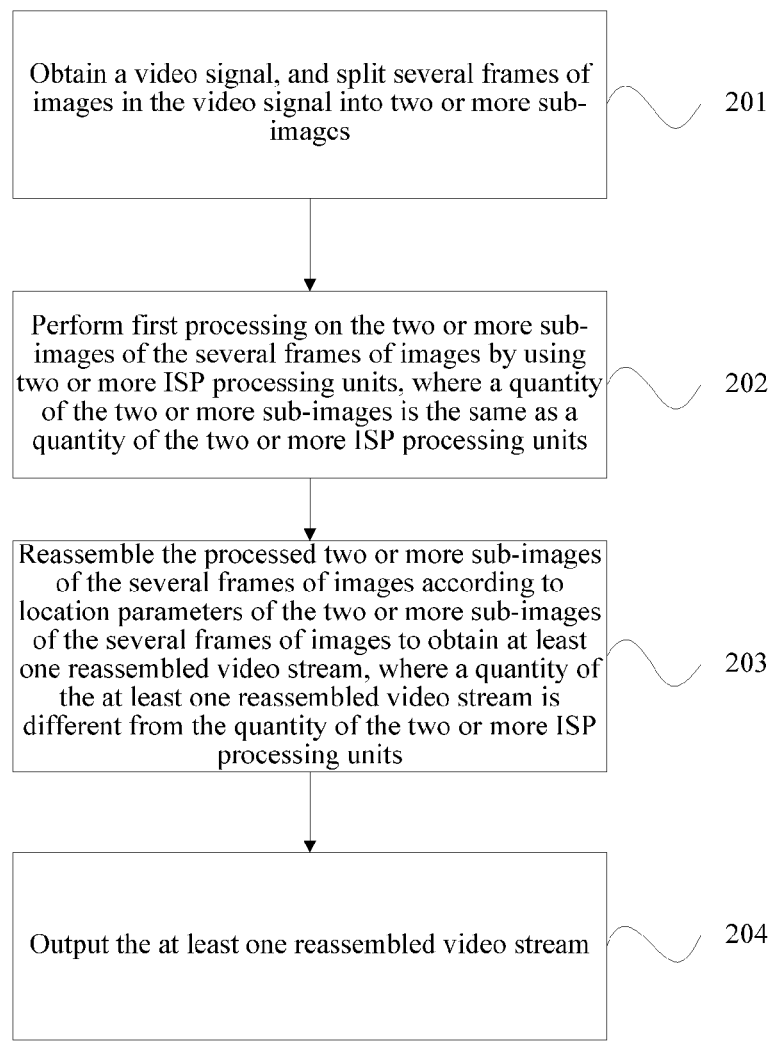
FIG. 1C is a schematic diagram of three color filter array (CFA) formats.
FIG. 2 is a flowchart of a video signal processing method according to an embodiment of the present invention.

(2) The CFA interpolation processing indicates that three colors, RGB, are obtained for each pixel using an interpolation method. Because each pixel of an image signal from the sensor has only one color of RGB, the CFA interpolation processing needs to be performed using a CFA interpolation algorithm. FIG. 1C is a schematic diagram of three CFA formats. As shown in FIG. 1C, there are three CFA formats; when the CFA interpolation processing in this embodiment is performed, a preset CFA format is used, so that the CFA interpolation processing matches an actual CFA arrangement of the sensor.

(3) The RGB2RGB transform is used to implement color space transform, where an image after the transform has brighter colors; a specific formula of the RGB2RGB transform may be as follows: Rout=M11×Rin+M21×Gin+M31×Bin+Roffset; Gout=M12×Rin+M22×Gin+M32×Bin+Goffset; Bout=M13×Rin+M23×Gin+M33×Bin+Boffset; where Rin, Gin, and Bin are indexes of three primary colors of a received sub-image respectively; M11, M21, M31, M12, M22, M32, M13, M23, and M33 are coefficients of a 3×3 matrix; Rout, Gout, and Bout are indexes of the three primary colors after adjustment; and Roffset, Goffset, and Boffset are adjustment values of the three primary colors respectively.

(4) The gamma transform is a non-linear change, and is used to increase image brightness; the transform generally uses a method of table lookup. Rout=LUT(Rin); Gout=LUT(Gin); Bout=LUT(Bin); where LUT( ) is a preset gamma transform table, which includes indexes of three primary colors and corresponding indexes of the three primary colors after the gamma transform.

(5) The RGB2YCbCr transform is used to perform color space transform: Yout=K11×Rin+K21×Gin+K31×Bin+Yoffset; Cbout=K12×Rin+K22×Gin+K32×Bin+Cboffset; Crout=K13×Rin+K23×Gin+K33×Bin+Croffset; where Rin, Gin, and Bin are indexes of three primary colors of a received sub-image respectively; K11, K21, K31, K12, K22, K32, K13, K23, and K33 are coefficients of a 3×3 matrix; Yout, Cbout, and Crout are output brightness, output blue difference, and output red difference respectively, which are clearly defined in the international standard CCIR-601; and Yoffset, Cboffset, and Croffset are adjustment values of the brightness, the blue difference, and the red difference respectively.

It should be noted that various parameters for the first processing in the ISP processing unit may be set using a controller, where a specific function of the controller is controlling the ISP processing unit to process an image, to output an ideal non-overlapping and lossless video stream.

103. Output the processed two or more sub-images of the several frames of images.

After the two or more ISP processing units process the sub-images, the processed sub-images are output, where the output sub-images are arranged by frame to form video data streams. In this embodiment, a quantity of the output video data streams is the same as a quantity of the ISP processing units, and the video data streams may be directly output to playback devices for video playback.

In the method provided by this embodiment, an image is split and each of two or more ISP processing units is used to perform processing on a sub-image after splitting, which may improve resolution of output images, make images at joints clear, and implement an ultra-high resolution camera, thereby avoiding deficiencies such as image overlapping or missing at a seam, color difference, and out of synchronization that occur because an existing ultra-high definition video camera system uses a plurality of cameras to perform image splicing.

FIG. 2 is a flowchart of a video signal processing method according to an embodiment of the present invention. Referring to FIG. 2, this embodiment includes the following:

201. Obtain a video signal, and split several frames of images in the video signal into two or more sub-images.

Step 201 is similar to step 101, and is not described herein again.

202. Perform first processing on the two or more sub-images of the several frames of images using two or more ISP processing units, where a quantity of the two or more sub-images is the same as a quantity of the two or more ISP processing units.

Step 202 is similar to step 102, and is not described herein again.

203. Reassemble the processed two or more sub-images of the several frames of images according to location parameters of the two or more sub-images of the several frames of images to obtain at least one reassembled video stream, where a quantity of the at least one reassembled video stream is different from the quantity of the two or more ISP processing units.

In this embodiment, the quantity of the at least one reassembled video stream is different from the quantity of the two or more ISP processing units; that is, after the processing performed by the ISP processing units, each ISP processing unit outputs a processed sub-image, where a plurality of sub-image data streams is reassembled to obtain video streams of a quantity that is greater than or less than the quantity of the plurality of sub-image data streams.

The reassembling includes performing splicing or cutting processing on the processed sub-images according to the location parameters.

For example, m ISP processing units output m processed sub-images, the m processed sub-images are reassembled and sorted to form n video streams, and the n video streams are output according to a standard video format, where m is unequal to n.

It should be noted that the reassembling process may be implemented using a reassembling unit, where the reassembling unit is configured to split and splice a plurality of video screens (the processed two or more sub-images of the several frames of images) to form one or more video screens (one or more reassembled video streams).

204. Output the at least one reassembled video stream.

After the at least one reassembled video stream is obtained, a quantity of the output video data streams is the same as a quantity of playback devices or less than the quantity of the playback devices, so that the output video data streams may be directly output to the playback devices for video playback.

In the method provided by this embodiment, an image is split and each of two or more ISP processing units is used to perform processing on a sub-image after splitting, which may improve resolution of output images, make images at joints clear, and implement an ultra-high resolution camera, thereby avoiding deficiencies such as image overlapping or missing at a seam, color difference, and out of synchronization that occur because an existing ultra-high definition video camera system uses a plurality of cameras to perform image splicing. Further, a plurality of processed sub-images is reassembled, so that a quantity of video streams that are output in the method may be suitable for a plurality of combination forms of playback devices, and an application range is wide.

Figure 3:
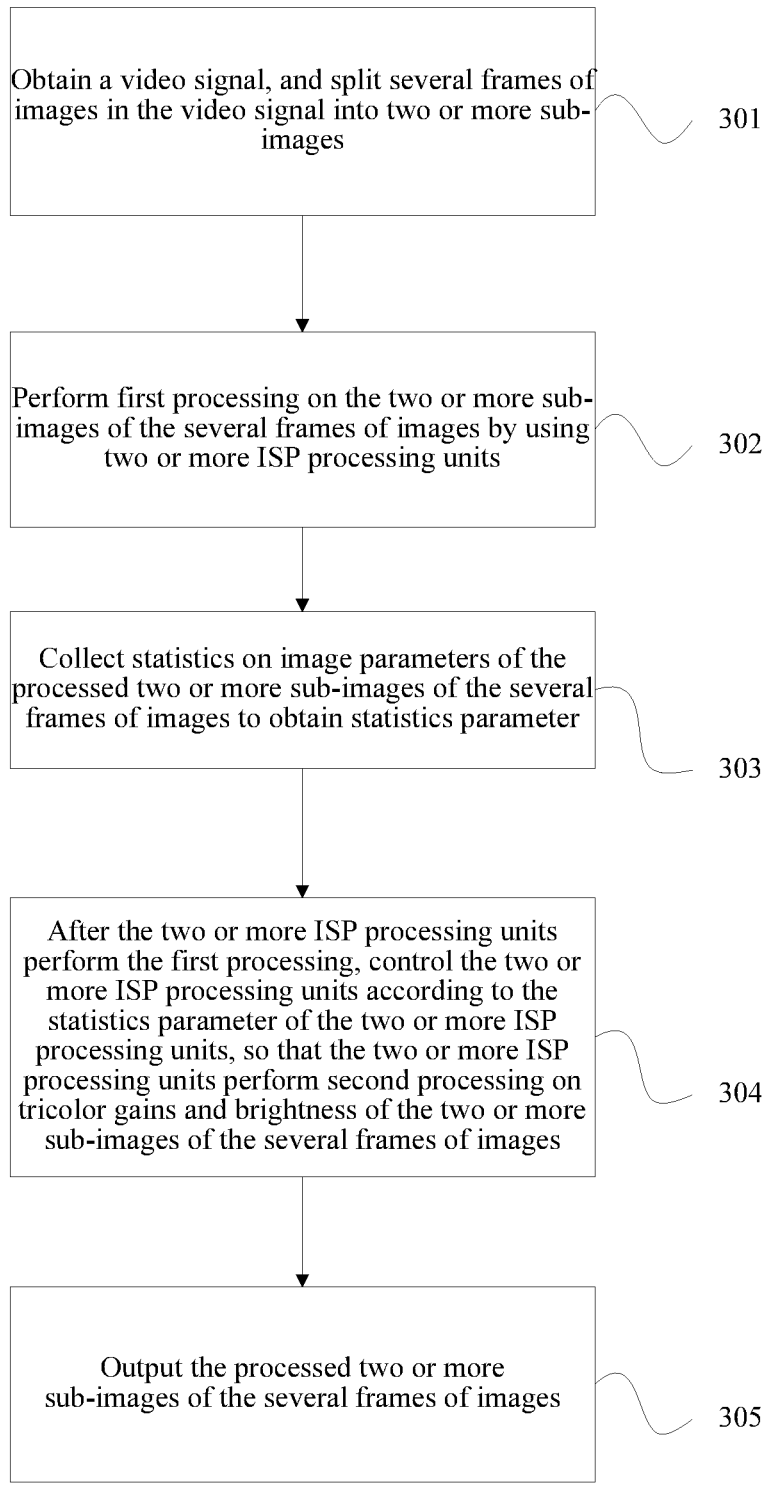
FIG. 3 is a flowchart of a video signal processing method according to an embodiment of the present invention.

FIG. 3 is a flowchart of a video signal processing method according to an embodiment of the present invention. Referring to FIG. 3, this embodiment includes the following:

301. Obtain a video signal, and split several frames of images in the video signal into two or more sub-images.

Step 301 is similar to step 101, and is not described herein again.

302. Perform first processing on the two or more sub-images of the several frames of images using two or more ISP processing units.

Step 302 is similar to step 102, and is not described herein again.

303. Collect statistics on image parameters of the processed two or more sub-images of the several frames of images to obtain statistics parameter.

The statistics parameter includes an average value of three primary colors, RGB, and an average value of brightness Y of an entire image or a specified statistics window. After the statistics parameter is obtained, three-primary-color gains, GainR, GainG, and GainB, are adjusted according to a calculation result of 2 A (auto-exposure (AE) and auto white balance (AWB)) algorithms, so that the images output by the ISP processing units have proper brightness and retain white balance.

2 A refers to AE and AWB; under the influence of ambient illumination, an image output from a sensor may be too dark, too bright, too blue, or too red. An AE algorithm adjusts the three-primary-color gains, GainR, GainG, and GainB, according to the "gray world assumption" principle, so that average brightness Yavg of the image reaches a preset target value. An AWB algorithm adjusts the three-primary-color gains, GainR, GainG, and GainB, according to the "gray world assumption" principle, so that three-primary-color average values, Ravg, Gavg, and Bavg, of the image are almost equal. A person skilled in the art may learn that the "gray world assumption" principle is that in a natural scene, an average value of an image is approximate to gray and is neither too bright nor too dark; Ravg, Gavg, and Bavg are almost equal. A person skilled in the art may learn that the 2 A algorithms may have a plurality of variants, which is not limited in this embodiment.

It should be noted that the statistics collection is implemented by the ISP processing units; the ISP processing units collect statistics on the sub-images after the first processing in step 302, to obtain the average value of the three primary colors, RGB, and the average value of the brightness Y of the sub-images, and send obtained data to the controller; the controller adjusts the parameters of the ISP processing units using the average values and the 2 A algorithms, and controls the ISP processing units to perform the second processing on the received sub-images.

304. After the two or more ISP processing units perform the first processing, control the two or more ISP processing units according to the statistics parameter of the two or more ISP processing units, so that the two or more ISP processing units perform second processing on tricolor gains and brightness of the two or more sub-images of the several frames of images.

The statistics parameter is obtained by collecting statistics on the tricolor gains and brightness of the processed sub-images that are output by the ISP processing units; in step 304, the ISP processing units adjust three-primary-color gains, GainR, GainG, and GainB, according to the statistics parameter, so that the images output by the ISP processing units have proper brightness and retain white balance.

It should be noted that a controller sets various parameters of the ISP processing units according to the statistics parameter, so that the ISP processing units perform the second processing; the controller calculates the tricolor gains and brightness according to the statistics parameter obtained in step 303 and 2 A algorithms, thereby adjusting the set parameters, so that the ISP processing units perform the second processing on received sub-images.

305. Output the processed two or more sub-images of the several frames of images.

After the two or more ISP processing units process the sub-images, the processed sub-images are output, where the output sub-images are arranged by frame to form video data streams. In this embodiment, a quantity of the output video data streams is the same as a quantity of the ISP processing units, and the video data streams may be directly output to playback devices for video playback.

In the method provided by this embodiment, an image is split and each of two or more ISP processing units is used to perform processing on a sub-image after splitting, which may improve resolution of output images, make images at joints clear, and implement an ultra-high resolution camera, thereby avoiding deficiencies such as image overlapping or missing at a seam, color difference, and out of synchronization that occur because an existing ultra-high definition video camera system uses a plurality of cameras to perform image splicing. Further, statistics are collected on tricolor gains and brightness of a plurality of processed sub-images, and processing performed by the ISP processing units on the tricolor gains and brightness is controlled according to a statistics parameter obtained by means of statistics collection, so that output sub-images have proper brightness and retain white balance.

Figure 4:
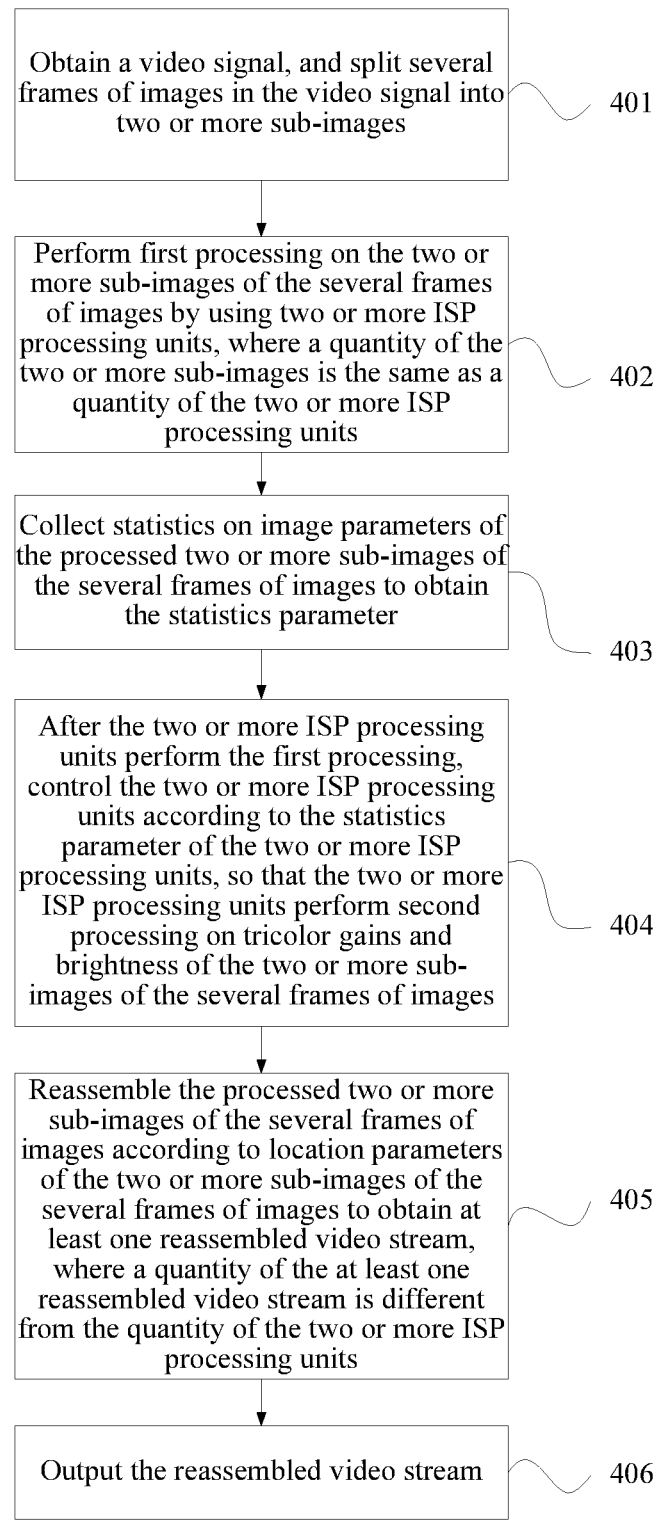
FIG. 4 is a flowchart of a video signal processing method according to an embodiment of the present invention.

FIG. 4 is a flowchart of a video signal processing method according to an embodiment of the present invention. Referring to FIG. 4, this embodiment includes the following:

401. Obtain a video signal, and split several frames of images in the video signal into two or more sub-images.

Step 401 is similar to step 101, and is not described herein again.

402. Perform first processing on the two or more sub-images of the several frames of images using two or more ISP processing units, where a quantity of the two or more sub-images is the same as a quantity of the two or more ISP processing units.

Step 402 is similar to step 102, and is not described herein again.

403. Collect statistics on image parameters of the processed two or more sub-images of the several frames of images to obtain the statistics parameter.

Step 403 is similar to step 303, and is not described herein again.

404. After the two or more ISP processing units perform the first processing, control the two or more ISP processing units according to the statistics parameter of the two or more ISP processing units, so that the two or more ISP processing units perform second processing on tricolor gains and brightness of the two or more sub-images of the several frames of images.

Step 404 is similar to step 304, and is not described herein again.

405. Reassemble the processed two or more sub-images of the several frames of images according to location parameters of the two or more sub-images of the several frames of images to obtain at least one reassembled video stream, where a quantity of the at least one reassembled video stream is different from the quantity of the two or more ISP processing units.

Step 405 is similar to step 203, and is not described herein again.

406. Output the at least one reassembled video stream.

After the at least one reassembled video stream is obtained, a quantity of output video data streams is the same as a quantity of playback devices or less than the quantity of the playback devices, so that the output video data streams may be directly output to the playback devices for video playback.

In the method provided by this embodiment, an image is split and each of two or more ISP processing units is used to perform processing on a sub-image after splitting, which may improve resolution of output images, make images at joints clear, and implement an ultra-high resolution camera, thereby avoiding deficiencies such as image overlapping or missing at a seam, color difference, and out of synchronization that occur because an existing ultra-high definition video camera system uses a plurality of cameras to perform image splicing. Further, a plurality of processed sub-images is reassembled, so that a quantity of video streams that are output in the method may be suitable for a plurality of combination forms of playback devices, and an application range is wide. Further, statistics are collected on tricolor gains and brightness of a plurality of processed sub-images, and processing performed by the ISP processing units on the tricolor gains and brightness is controlled according to a statistics parameter obtained by means of statistics collection, so that output sub-images have proper brightness and retain white balance.

Figure 5:
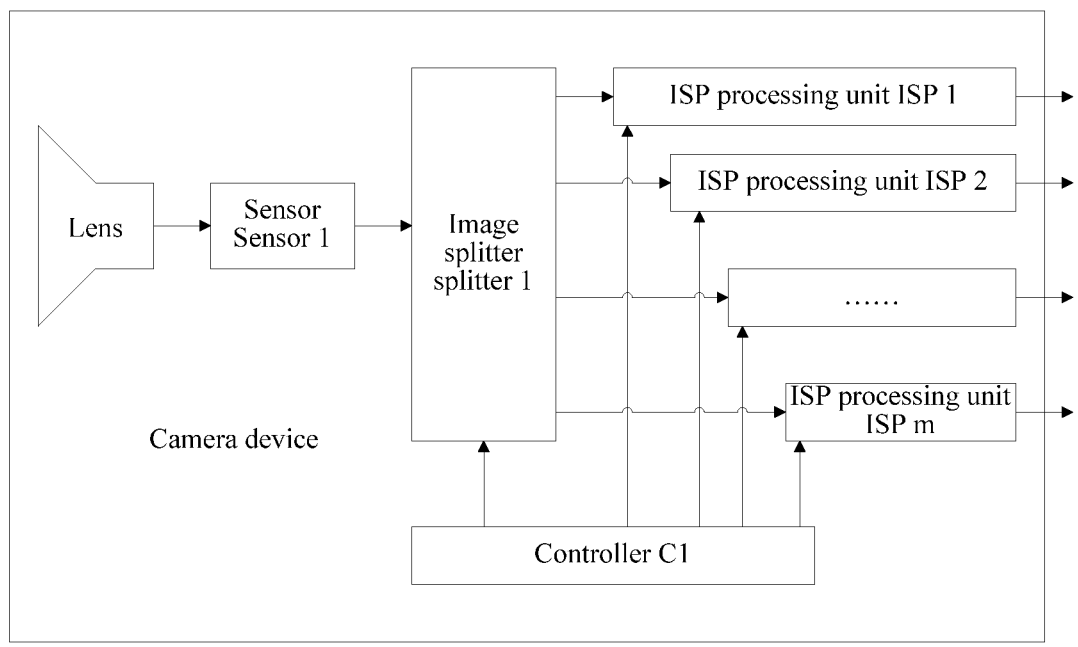
FIG. 5 is a schematic structural diagram of a camera device according to an embodiment of the present invention.

FIG. 5 is a schematic structural diagram of a camera device according to an embodiment. Referring to FIG. 5, the camera device includes a lens, a sensor (Sensor 1), an image splitter (splitter 1), a controller C1, and two or more ISP processing units ISP 1, ISP 2, . . . , ISP m.

The sensor (Sensor 1) is configured to obtain a video signal using the lens.

The image splitter (splitter 1) is configured to split several frames of images in the video signal into two or more sub-images, and transmit the two or more sub-images of the several frames of images to the two or more ISPs respectively, where a quantity of the two or more sub-images is the same as a quantity of the two or more ISP processing units.

The image splitter (splitter 1) may split each frame of image using any one of the following methods. (1) split an image frame into a plurality of sub-images of preset orientations according to the preset orientations (heights and widths of the sub-images); (2) split an image frame into two or more sub-images according to a preset pixel value, where a maximum of pixel values included in each sub-image is the preset pixel value; and (3) split an image frame into N sub-images of equal orientations according to a quantity N of ISP processing units. A manner of the splitting includes but is not limited to the foregoing methods, and is not limited in this embodiment of the present invention.

Further, each sub-image after the splitting has a corresponding location parameter, where the location parameter includes coordinates of a start point of the sub-image in an original image and an orientation of the sub-image (a height and a width of the sub-image).

It should be noted that when image splitting is performed, adjacent images may have an overlapping portion and may also have a seam portion; certainly, seamless splicing may also be performed; a specific manner of splitting an image may be adjusted according to an arrangement of playback devices and specific forms of the playback devices.

The two or more ISP processing units ISP 1, ISP 2, ..., ISP m are configured to perform first processing on the two or more sub-images of the several frames of images using the two or more ISP processing units, and output the processed two or more sub-images of the several frames of images, where the quantity of the two or more sub-images is the same as the quantity of the two or more ISP processing units.

The controller C1 is configured to control the two or more ISP processing units ISP 1, ISP 2, ..., ISP m.

The controller C1 controls the image splitter (splitter 1) to split the several frames of images in the received video signal, and controls the two or more ISP processing units to process the two or more sub-images of the several frames of images, where the two or more sub-images are obtained by means of splitting, to output the processed sub-images.

The first processing includes one or more of the following video processing functions: zoom processing, CFA interpolation processing, RGB2RGB transform, gamma transform, and RGB2YCbCr.

Figure 6:
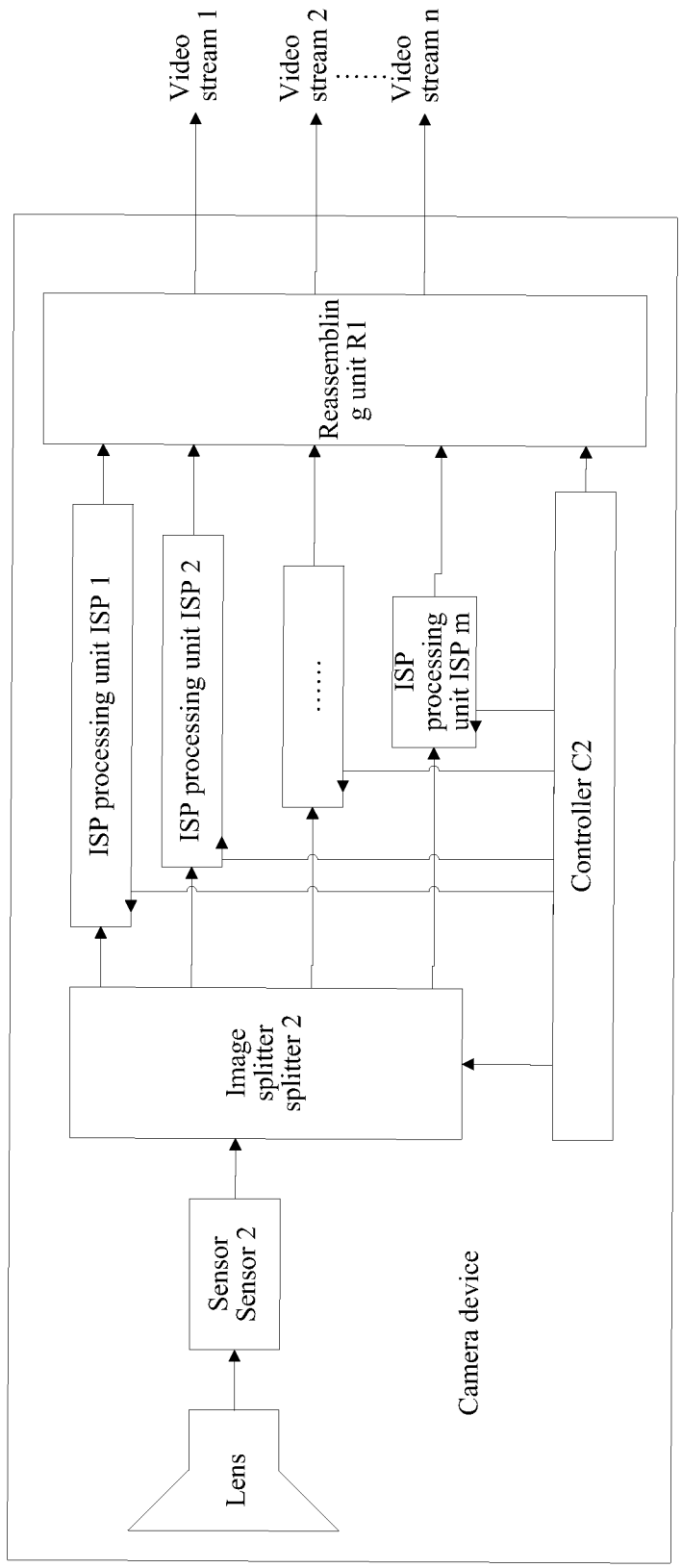
FIG. 6 is a schematic structural diagram of a camera device according to an embodiment of the present invention.

FIG. 6 is a schematic structural diagram of a camera device according to an embodiment. Referring to FIG. 6, the camera device includes a lens, a sensor (Sensor 2), an image splitter (splitter 2), a controller C2, two or more ISP processing units ISP 1, ISP 2, ..., ISP m, and a reassembling unit R1.

The sensor (Sensor 2) is configured to obtain a video signal using the lens.

The image splitter (splitter 2) is configured to split several frames of images in the video signal into two or more sub-images, and transmit the two or more sub-images of the several frames of images to the two or more ISPs respectively, where a quantity of the two or more sub-images is the same as a quantity of the two or more ISP processing units.

The two or more ISP processing units ISP 1, ISP 2, ..., ISP m are configured to perform first processing on the two or more sub-images of the several frames of images using the two or more ISP processing units, and output the processed two or more sub-images of the several frames of images, where the quantity of the two or more sub-images is the same as the quantity of the two or more ISP processing units.

The controller C2 is configured to control the two or more ISP processing units ISP 1, ISP 2, ..., ISP m.

The reassembling unit R1 is configured to reassemble the processed two or more sub-images of the several frames of images according to location parameters of the two or more sub-images of the several frames of images to obtain at least one reassembled video stream, where a quantity of the at least one reassembled video stream is different from the quantity of the two or more ISP processing units.

The controller C2 sets a reassembling parameter of the reassembling unit R1 according to the location parameters of the sub-images, so that n video streams that are output do not overlap and remain lossless at a joint.

The first processing includes one or more of the following video processing functions: zoom processing, CFA interpolation processing, RGB2RGB transform, gamma transform, and RGB2YCbCr.

Figure 7:
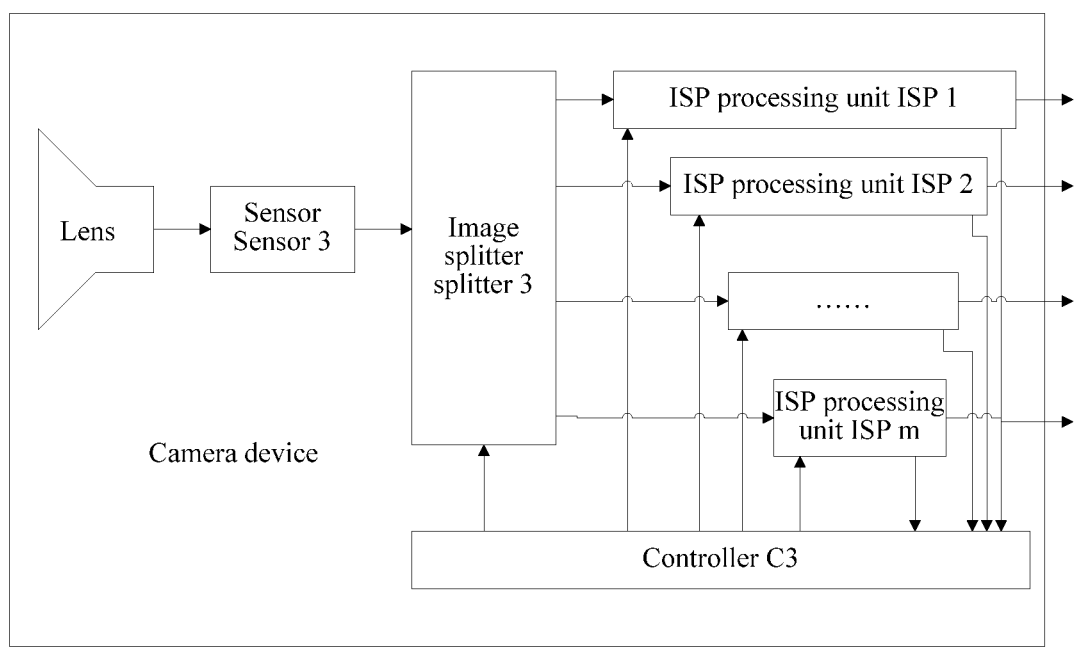
FIG. 7 is a schematic structural diagram of a camera device according to an embodiment of the present invention.

FIG. 7 is a schematic structural diagram of a camera device according to an embodiment. Referring to FIG. 7, the camera device includes a lens, a sensor (Sensor 3), an image splitter (splitter 3), a controller C3, and two or more ISP processing units ISP 1, ISP 2, ..., ISP m.

The sensor (Sensor 3) is configured to obtain a video signal using the lens.

The image splitter (splitter 3) is configured to split several frames of images in the video signal into two or more sub-images, and transmit the two or more sub-images of the several frames of images to the two or more ISPs respectively, where a quantity of the two or more sub-images is the same as a quantity of the two or more ISP processing units.

The two or more ISP processing units ISP 1, ISP 2, ..., ISP m are configured to perform first processing on the two or more sub-images of the several frames of images using the two or more ISP processing units, and output the processed two or more sub-images of the several frames of images, where the quantity of the two or more sub-images is the same as the quantity of the two or more ISP processing units.

The controller C3 is configured to control the two or more ISP processing units ISP 1, ISP 2, ..., ISP m.

The two or more ISP processing units ISP 1, ISP 2, ..., ISP m are further configured to collect statistics on image parameters of the processed two or more sub-images of the several frames of images to obtain a statistics parameter, and send the statistics parameter to the controller C3.

The controller C3 is further configured to, when the two or more ISP processing units perform the first processing, control the two or more ISP processing units according to the statistics parameter of the two or more ISP processing units, so that the two or more ISP processing units perform second processing on tricolor gains and brightness of the two or more sub-images of the several frames of images.

The reassembling unit R2 is configured to reassemble the processed two or more sub-images of the several frames of images according to location parameters of the two or more sub-images of the several frames of images to obtain at least one reassembled video stream, where a quantity of the at least one reassembled video stream is different from the quantity of the two or more ISP processing units.

The first processing includes one or more of the following video processing functions: zoom processing, CFA interpolation processing, RGB2RGB transform, gamma transform, and RGB2YCbCr. The second processing at least includes one of tricolor gain adjustment and brightness adjustment.

Figure 8:
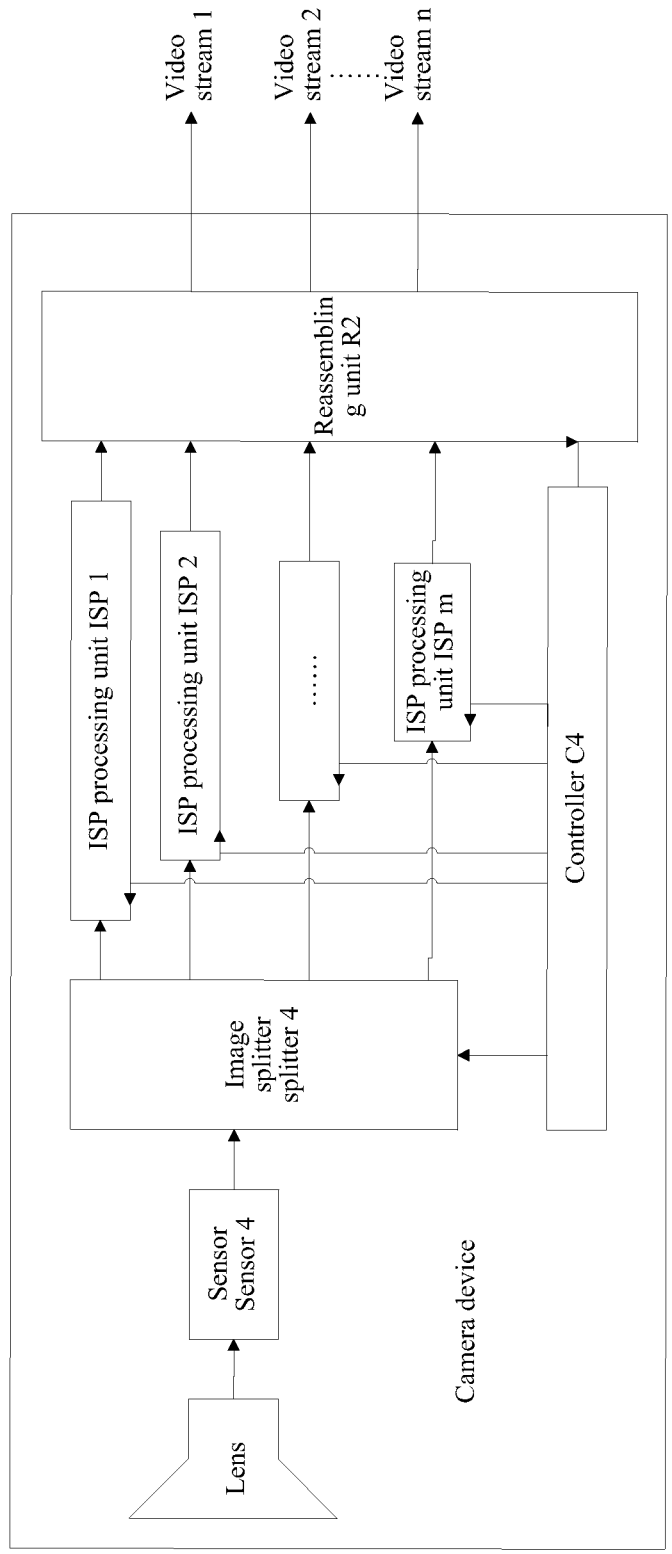
FIG. 8 is a schematic structural diagram of a camera device according to an embodiment of the present invention.

FIG. 8 is a schematic structural diagram of a camera device according to an embodiment. Referring to FIG. 8, the camera device includes a lens, a sensor (Sensor 4), an image splitter (splitter 4), a controller C4, two or more ISP processing units ISP 1, ISP 2, ..., ISP m, and a reassembling unit R2.

The sensor (Sensor 4) is configured to obtain a video signal using the lens.

The image splitter (splitter 4) is configured to split several frames of images in the video signal into two or more sub-images, and transmit the two or more sub-images of the several frames of images to the two or more ISPs respectively, where a quantity of the two or more sub-images is the same as a quantity of the two or more ISP processing units.

The two or more ISP processing units ISP 1, ISP 2, ..., ISP m are configured to perform first processing on the two or more sub-images of the several frames of images using the two or more ISP processing units, and output the processed two or more sub-images of the several frames of images, where the quantity of the two or more sub-images is the same as the quantity of the two or more ISP processing units.

The controller C4 is configured to control the two or more ISP processing units ISP 1, ISP 2, ..., ISP m.

The two or more ISP processing units ISP 1, ISP 2, ..., ISP m are further configured to collect statistics on image parameters of the processed two or more sub-images of the several frames of images to obtain a statistics parameter, and send the statistics parameter to the controller C4.

The controller C4 is further configured to, when the two or more ISP processing units perform the first processing, control the two or more ISP processing units according to the statistics parameter of the two or more ISP processing units, so that the two or more ISP processing units perform second processing on tricolor gains and brightness of the two or more sub-images of the several frames of images.

The first processing includes one or more of the following video processing functions: zoom processing, CFA interpolation processing, RGB2RGB transform, gamma transform, and RGB2YCbCr. The second processing at least includes one of tricolor gain adjustment and brightness adjustment.

It should be noted that in the foregoing embodiments, m is an integer greater than or equal to 2, and n is an integer greater than or equal to 1.

It should be noted that when each camera device provided by the foregoing embodiments processes a video signal, division of functional modules is used merely as an example for description; in an actual application, the functions may be allocated to different functional modules to complete according to requirements; that is, an internal structure of the device is divided into different functional modules to complete all or a part of functions described above. For example, an image splitter, an ISP processing unit, a controller, and the like may all be implemented by hardware (one or more chips), or may be implemented by a program instructing related hardware. The program may be stored in a computer readable storage medium. The storage medium may be a read-only memory, a magnetic disk, or an optical disc.

In addition, the camera device provided by the foregoing embodiments pertains to a same concept as the embodiments of the video signal processing method, and reference may be made to the method embodiments for a specific implementation process of the camera device, which is not described herein again.

The sequence numbers of the preceding embodiments of the present invention are merely for description purpose but do not indicate the preference of the embodiments.

A person of ordinary skill in the art may understand that all or a part of the steps of the embodiments may be implemented by hardware or a program instructing relevant hardware. The program may be stored in a computer readable storage medium. The storage medium may be a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A video signal processing method comprising:
   obtaining a video signal;
   splitting each of several frames in the video signal into two or more sub-images;
   performing first processing on the two or more sub-images of each of the several frames using two or more image sensor processors (ISPs) respectively, wherein a quantity of the two or more sub-images is the same as a quantity of the two or more ISPs;
   collecting statistics on image parameters of the first processed two or more sub-images of each of the several frames to obtain a statistics parameter, wherein the statistics parameter comprises an average value of each of a red, a green, and a blue (RGB) color value in at least part of the first processed two or more sub-images of each of the several frames and an average value of brightness;
   performing second processing on the RGB color values of the two or more sub-images of each of the several frames using the two or more ISPs according to the statistics parameter, wherein the second processing comprises adjusting a gain of each of the RGB color values of the two or more sub-images of each of the several frames to adjust the average value of the brightness to a preset target; or adjusting the gain of each of the RGB color values of the two or more sub-images of each of the several frames to adjust the average RGB color values to make each of the average RGB color values approximately equal to a remainder of the average RGB color values; and
   outputting the second processed two or more sub-images of each of the several frames.

2. The method according to claim 1, wherein, after performing first processing on the two or more sub-images of each of the several frames using the two or more ISP processing units, the method further comprises reassembling the first processed sub-images of the several frames according to location parameters of the sub-images of the several frames to obtain at least one reassembled video stream, wherein a quantity of the at least one reassembled video stream is different from the quantity of the two or more ISPs, and wherein outputting the second processed two or more sub-images of each of the several frames comprises outputting the at least one reassembled video stream.

3. The method according to claim 1, wherein the first processing comprises one or more of the following video processing functions: zoom processing, color filter array (CFA) interpolation processing, red, green, blue to red, green, blue (RGB2RGB) transform, gamma transform, and red, green, blue to luminance, blue difference component, red difference component (RGB2YCbCr) transform.

4. The method according to claim 1, wherein a first of the two or more sub-images of a first of the several frames overlaps a second of the two or more sub-images of the first of the several frames.

5. The method according to claim 4, wherein a third sub-image overlaps the first of the several frames and a second of the several frames, and wherein a fourth sub-image of the two or more sub-images of the second of the several frames overlaps the third sub-image.

6. The method according to claim 1, wherein the video signal is captured by a single camera.

7. The method according to claim 1, wherein the gain of each of the RGB color values is adjusted according to at least one of an auto-exposure algorithm and an auto white balance algorithm.

8. A camera device comprising:
   a lens;
   a sensor configured to obtain a video signal using the lens;
   two or more image sensor processors (ISPs);
   a controller configured to control the two or more ISPs; and
   an image splitter coupled to the two or more ISPs and configured to:
      split each of several frames in the video signal into two or more sub-images; and
      transmit the two or more sub-images of each of the several frames to the two or more ISPs respectively, wherein a quantity of the two or more sub-images is the same as a quantity of the two or more ISPs, wherein the two or more ISPs are configured to:
  perform first processing on the two or more sub-images of each of the several frames;
  collect statistics on image parameters of the first processed two or more sub-images of each of the several frames to obtain a statistics parameter, wherein the statistics parameter comprises an average value of each of a red, a green, and a blue (RGB) color value in at least part of the first processed two or more sub-images of each of the several frame and an average value of brightness; and
  send the statistics parameter to the controller,
wherein the controller is further configured to control the two or more ISPs, after the two or more ISPs perform the first processing, according to the statistics parameter, to:
  perform second processing on the RGB color values of the two or more sub-images of each of the several frames; and
  output the second processed two or more sub-images of each of the several frames, and
wherein the second processing comprises at least one of:
  adjusting a gain of each of the RGB color values of the two or more sub-images of each of the several frames to adjust the average value of the brightness to a preset target; and
  adjusting the gain of each of the RGB color values of the two or more sub-images of each of the several frames to adjust the average RGB color values to make each of the average RGB color values approximately equal to a remainder of the average RGB color values.

9. The camera device according to claim 8 further comprising a processor configured to reassemble processed sub-images of the several frames according to location parameters of the sub-images of the several frames to obtain at least one reassembled video stream, wherein a quantity of the at least one reassembled video stream is different from the quantity of the two or more ISPs.

10. The camera device according to claim 8, wherein the first processing comprises one or more of the following video processing functions: zoom processing, color filter array (CFA) interpolation processing, red, green, blue to red, green, blue (RGB2RGB) transform, gamma transform, and red, green, blue to luminance, blue difference component, red difference component (RGB2YCbCr) transform.

11. The camera device according to claim 8, wherein a first of the two or more sub-images of a first of the several frames overlaps a second of the two or more sub-images of the first of the several frames.

12. The camera device according to claim 11, wherein a third sub-image overlaps the first of the several frames and a second of the several frames, and wherein a fourth sub-image of the two or more sub-images of the second of the several frames overlaps the third sub-image.

13. The camera device according to claim 8, wherein the gain of each of the RGB color values is adjusted according to at least one of an auto-exposure algorithm and an auto white balance algorithm.

* * * * *